United States Patent
Reiling et al.

(10) Patent No.: US 11,156,182 B2
(45) Date of Patent: Oct. 26, 2021

(54) METHOD FOR CONTROLLING AN INTERNAL COMBUSTION ENGINE

(71) Applicant: Robert Bosch GmbH, Stuttgart (DE)

(72) Inventors: Florian Reiling, Remchingen (DE); Eduard Moser, Ludwigsburg (DE); Joerg Maas, Remseck (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/983,892

(22) Filed: Aug. 3, 2020

(65) Prior Publication Data

US 2021/0047977 A1 Feb. 18, 2021

(30) Foreign Application Priority Data

Aug. 13, 2019 (DE) .................... 102019212104.7

(51) Int. Cl.
*F02D 41/22* (2006.01)
*F02D 41/40* (2006.01)
*F02D 41/38* (2006.01)

(52) U.S. Cl.
CPC ......... *F02D 41/22* (2013.01); *F02D 41/3809* (2013.01); *F02D 41/40* (2013.01); *F02D 2200/0602* (2013.01)

(58) Field of Classification Search
CPC ...... F02D 41/22; F02D 41/3809; F02D 41/40; F02D 2200/0602
See application file for complete search history.

(56) References Cited

U.S. PATENT DOCUMENTS 8,528,523 B2 * 9/2013 Jung .................. F02D 41/3836
123/456

* cited by examiner

*Primary Examiner* — Hieu T Vo
(74) *Attorney, Agent, or Firm* — Norton Rose Fulbright US LLP; Gerard Messina

(57) ABSTRACT

A method for controlling an internal combustion engine, in which, based on a rail pressure signal, a first characteristic variable is specified that indicates a misfire, a misfire being recognized when the rail pressure signal does not have the expected curve.

10 Claims, 2 Drawing Sheets

METHOD FOR CONTROLLING AN INTERNAL COMBUSTION ENGINE

CROSS REFERENCE

The present application claims the benefit under 35 U.S.C. § 119 of German Patent Application No. DE 102019212104.7 filed on Aug. 13, 2019, which is expressly incorporated herein by reference in its entirety.

FIELD

The present invention relates to a method for controlling an internal combustion engine.

BACKGROUND INFORMATION

In such methods for controlling an internal combustion engine, misfire recognition is frequently provided. For this purpose, based on the rotational speed a characteristic variable is specified that indicates a misfire. In order to ascertain this characteristic variable, the rotational speed signal of the internal combustion engine is analyzed. Standardly, in the rotational speed signal, there occur oscillating amplitudes that are correlated with the individual combustions in the individual cylinders. If the increase in the rotational speed in one cylinder is less than in the others, then a misfire is recognized for this cylinder.

Such misfires can have various causes. Thus, for example in a gasoline internal combustion engine the misfiring may be caused by an omitted ignition of the mixture. In this case, this is referred to as an ignition misfire. In addition, it may occur that due to a defect, in particular of the injection valve, no fuel flows into the respective cylinder. In this case, an injection misfire is referred to. By evaluating the rotational speed, it can be recognized only whether a combustion has taken place. However, it is not possible to distinguish between ignition misfires and injection misfires.

SUMMARY

Through the procedure according to the present invention, in which, based on a rail pressure signal, a first characteristic variable is specified that indicates a misfire, an injection misfire can be reliably recognized. Here, the first characteristic variable that indicates a misfire is output when the rail pressure signal does not have the expected curve. This means that a misfire is recognized when the rail pressure signal does not have the expected curve. Here it is advantageous that an injection misfire is reliably recognized on the basis of the rail pressure signal.

It is particularly advantageous if the first characteristic variable is outputted when the rail pressure signal increases. For this purpose, the difference is evaluated between two measurement values for the rail pressure. The evaluated variable corresponds approximately to the first time derivative of the rail pressure.

A particularly reliable recognition of a misfire results when the evaluation of the rail pressure signal is correlated with the injection. This means that the first characteristic variable is outputted only when the rail pressure increases after a provided injection.

In a particularly advantageous specific embodiment, a second characteristic variable is specified that indicates a misfire. This variable is preferably specified on the basis of a rotational speed variable. If the two characteristic variables are regarded together, it is then possible to distinguish between injection misfires and ignition misfires. If the second characteristic variable is present and at the same time no first characteristic variable is present, then it is assumed that an ignition misfire is present. If both characteristic variables are recognized, it can then be assumed that an injection misfire is present. In this way, an error can be attributed to the individual components.

In a further aspect, the present invention relates to a new program code together with processing instructions for producing a computer program capable of being executed on a control device, in particular source code having compiler and/or linking instructions, the program code yielding the computer program for carrying out all the steps of one of the described methods when it is converted, according to the processing instructions, into an executable computer program, i.e., in particular is compiled and/or linked. This program code can be provided in particular by source code that can be downloaded for example from a server on the Internet.

BRIEF DESCRIPTION OF THE DRAWINGS

Exemplary embodiments of the present invention are shown in the figures and are explained in more detail below.

DETAILED DESCRIPTION OF EXAMPLE EMBODIMENTS

Figure 1:
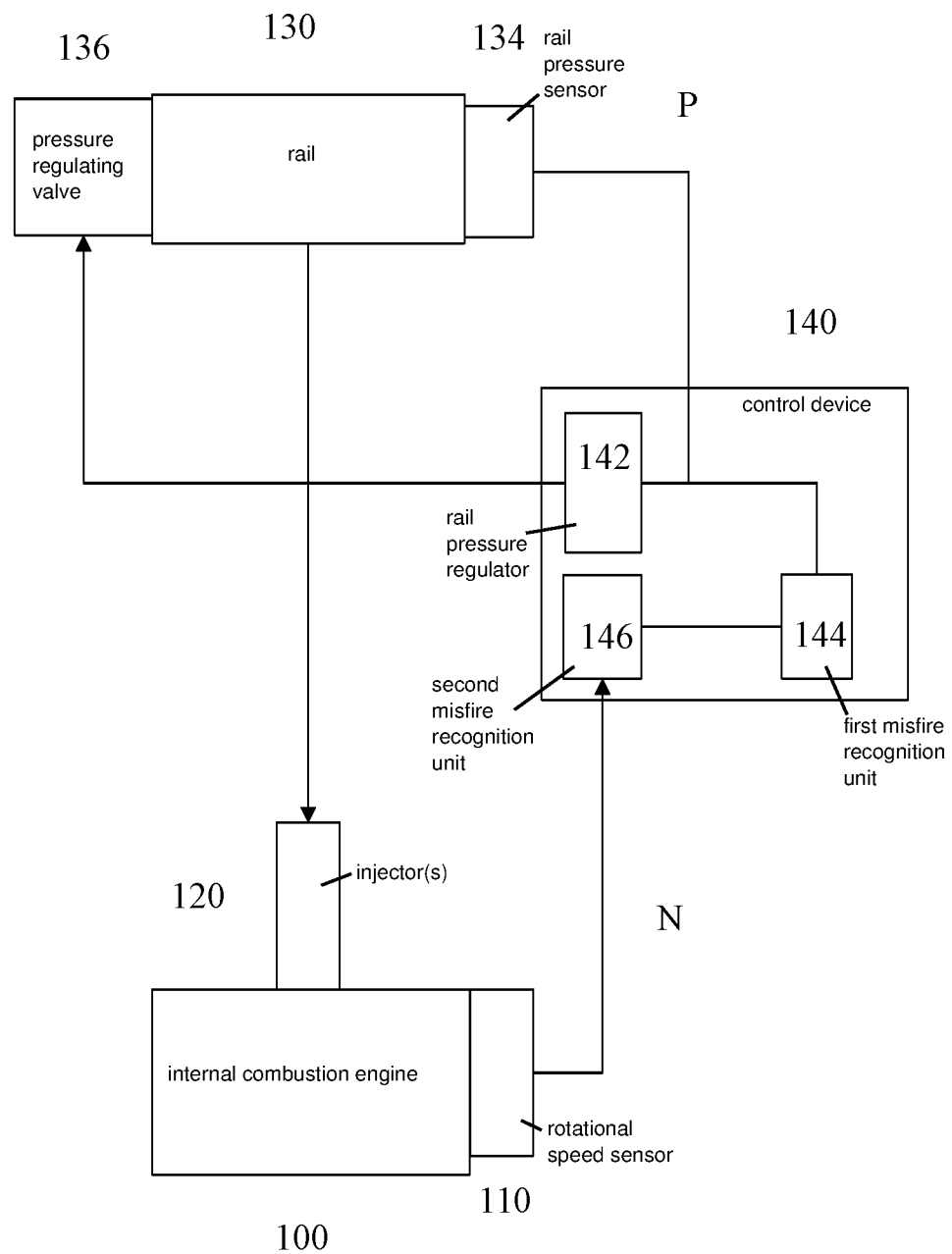
FIG. 1 shows main elements of an internal combustion engine and of the corresponding injection system.

In FIG. 1, the main elements of an internal combustion engine, a fuel supply system, and a control device are shown. The internal combustion engine is designated 100. On it is situated a rotational speed sensor 110 that provides a rotational speed signal N. Fuel is metered to internal combustion engine 100 via at least one injector 120 per cylinder. The fuel is provided, under high pressure, by a rail 130. A rail pressure sensor 134 that provides a rail pressure signal P is provided on rail 130. This signal corresponds to the pressure of the fuel in rail 130. Rail pressure P can be regulated to specified values by a pressure regulating valve 136.

A control device is designated 140. This device includes, inter alia, a rail pressure regulator 142, a first misfire recognition unit 144, and, in a particularly advantageous embodiment, a second misfire recognition unit 146. Pressure regulator 142 compares the rail pressure P measured by sensor 134 with a specified target value. As a function of the deviation, pressure regulating valve 136 is then correspondingly controlled so that the corresponding rail pressure is set. Alternatively or in addition to pressure regulating valve 136, it can also be provided that pressure regulator 142 controls, in the sense of pressure regulation, a high-pressure pump (not shown) that supplies rail 130 with fuel. Here, in particular a so-called metering unit or a so-called electrical suction valve is used. Such devices are conventional in the related art.

In addition, it is conventional that a misfire recognition unit 146 is provided that evaluates output signal N of rotational speed sensor 110. On the basis of rotational speed signal N, this unit (hereinafter designated second misfire recognition unit 146) recognizes whether a misfire is present. This second misfire recognition unit 146 provides a second characteristic variable that indicates a misfire.

According to the present invention, it is now provided that the output signal of rail pressure sensor 134 is supplied to a first misfire recognition unit 144. This misfire recognition unit 144 correspondingly evaluates the output signal of the rail pressure sensor, and provides a first characteristic variable that indicates a misfire.

Rail pressure regulator 142 regulates rail pressure P to a specified target value. Standardly, the high-pressure pump and the regulator are designed such that when there is an injection, fuel is further conveyed into rail 130 by the high-pressure pump so that the rail pressure remains almost constantly at the target value.

If a fault occurs, for example in injector 120, that has the result that no injection takes place, this has the consequence that rail pressure P increases sharply, because no fuel is conveyed via the injector into the combustion chamber, and the high-pressure pump conveys fuel into rail 130. By evaluating the rail pressure, the pressure increase is recognized. On the basis of the pressure increase, a misfire is recognized and a first characteristic variable is specified. If such a rail pressure increase is recognized, then, based on the rail pressure signal, a first characteristic variable is specified that indicates that a misfire is present. In particular, this first characteristic variable indicates that no injection has taken place. This is also referred to as an injection misfire.

According to the present invention, for this purpose the rail pressure signal is acquired with high temporal resolution. In addition, a difference formation is carried out between two successive pressure values, measured at a short interval. If this difference value exceeds a specified threshold value, then a pressure increase due to an injection misfire is recognized, and the first characteristic variable, indicating a misfire, is outputted. It is particularly advantageous if this method is combined with other methods for recognizing an ignition misfire. According to the present invention, using a second misfire recognition unit 146, based on the rotational speed signal a second characteristic variable is ascertained that indicates a misfire; in this way, it is possible to distinguish between injection misfires and ignition misfires. Instead of the rotational speed signal, the second misfire recognition unit can also use other variables for misfire recognition.

Figure 2:
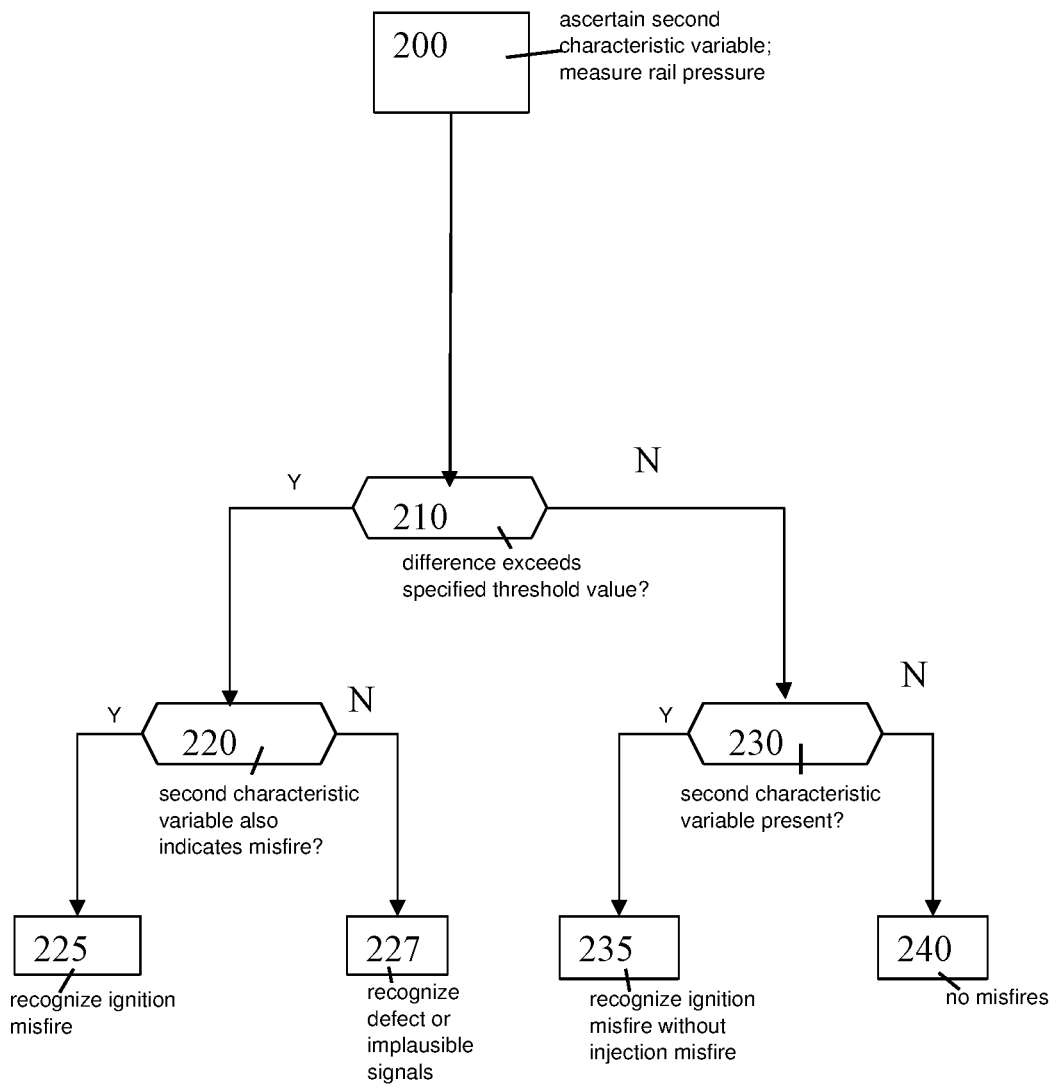
FIG. 2 shows a flow diagram illustrating the procedure according to the present invention.

In FIG. 2, the procedure according to the present invention is explained on the basis of a flow diagram. In a first step 200, the second characteristic variable, indicating a misfire, is ascertained, preferably based on the rotational speed. In addition, the rail pressure P is measured with high temporal resolution. The differences between two successive measurement values for the rail pressure are ascertained.

Query 210 checks whether the differences between two successive measurement values of the rail pressure exceeds a specified threshold value. If this is the case, then query 220 takes place. In this query 220, it is checked whether the second characteristic variable also indicates a misfire. If this is also the case, then in step 225 an injection misfire is recognized. If this is not the case, then in step 227 a defect, or implausible signals, are recognized.

If query 210 recognizes that there is no exceeding of a threshold value, then query 230 takes place. Query 230 checks whether the second characteristic variable is present, indicating that an ignition misfire is present. If this is the case, then in step 235 an ignition misfire without an injection misfire is recognized.

If query 230 recognizes that no ignition misfire is present, then in step 240 it is recognized that no misfires are present, and the program execution ends without recognizing an error.

In a particularly advantageous embodiment, it is provided that a misfire is recognized if the rail pressure signal increases in an injection interval. This means that an evaluation of rail pressure P takes place only in a time region in which an injection takes place, or only when a signal is present that indicates an injection.

According to the present invention, an injection misfire, and thus an omitted injection, are recognized if both the second characteristic variable and the first characteristic variable, which indicate misfires, indicate a misfire. An omitted ignition, and thus an misfire, is recognized if only the second characteristic variable indicates a misfire. The first characteristic variable, which indicates a misfire, is specified on the basis of rail pressure signal P, and the second characteristic variable, which indicates a misfire, is specified on the basis of other variables, in particular the rotational speed N. If only the first characteristic variable indicates a misfire, then a more extensive error diagnosis is required. This can result for example due to the circumstance that a misfire was not recognized based on the rotational speed signal, but such a misfire is present. In this case, second misfire recognition unit 146 may for example not be operating correctly. In this case, this means that a defective second misfire recognition unit is recognized.

What is claimed is:

1. A method for controlling an internal combustion engine, the method comprising:
   specifying, based on a rail pressure signal, a first characteristic variable that indicates a misfire; and
   outputting the first characteristic variable indicating the misfire when the rail pressure signal does not have an expected curve.

2. The method as recited in claim 1, wherein the first characteristic variable, which indicates the misfire, is output when the rail pressure signal increases.

3. The method as recited in claim 2, wherein the first characteristic variable, which indicates the misfire, is output when the rail pressure signal increases in an injection interval.

4. The method as recited in claim 1, wherein a second characteristic variable is specified that indicates a misfire.

5. The method as recited in claim 4, wherein the second characteristic variable is specified based on a rotational speed variable.

6. The method as recited claim 4, wherein an omitted injection is recognized when both the first characteristic variable and the second characteristic variable indicate a misfire.

7. The method as recited in claim 4, wherein an omitted ignition is recognized when only the second characteristic variable indicates a misfire.

8. A non-transitory machine-readable storage medium on which is stored a computer program for controlling an internal combustion engine, the computer program, when executed by a computer, causing the computer to perform the following steps:
   specifying, based on a rail pressure signal, a first characteristic variable that indicates a misfire; and
   outputting the first characteristic variable indicating the misfire when the rail pressure signal does not have an expected curve.

9. A control device configured to control an internal combustion engine, the control device configured to:
   specify, based on a rail pressure signal, a first characteristic variable that indicates a misfire; and output the first characteristic variable indicating the misfire when the rail pressure signal does not have an expected curve.

10. A non-transitory machine readable storage medium on which is stored program code, together with processing instructions, for producing a computer program capable of being executed on a control device, the program code yielding the computer program as when it is converted into an executable computer program according to the processing instructions, the executable computer program, when executed by the control device, causing the control device to perform the following steps:

specifying, based on a rail pressure signal, a first characteristic variable that indicates a misfire; and outputting the first characteristic variable indicating the misfire when the rail pressure signal does not have an expected curve.

* * * * *